(12) United States Patent
Gross

(10) Patent No.: US 10,450,920 B2
(45) Date of Patent: Oct. 22, 2019

(54) TANK DEVICE

(71) Applicant: MAGNA STEYR Fuel Systems GesmbH, Sinabelkirchen (AT)

(72) Inventor: Joerg Gross, Wesseling (DE)

(73) Assignee: MAGNA STEYR Fuel Systems GesbmH, Sinabelkirchen (AT)

( * ) Notice: Subject to any disclaimer, the term of this patent is extended or adjusted under 35 U.S.C. 154(b) by 64 days.

(21) Appl. No.: 15/840,499

(22) Filed: Dec. 13, 2017

(65) Prior Publication Data

US 2018/0291789 A1 Oct. 11, 2018

(30) Foreign Application Priority Data

Apr. 6, 2017 (EP) ..................................... 17165225

(51) Int. Cl.
*F01N 3/20* (2006.01)
*B60K 13/04* (2006.01)
*B60K 15/04* (2006.01)

(52) U.S. Cl.
CPC ............ *F01N 3/2066* (2013.01); *B60K 13/04* (2013.01); *B60K 15/04* (2013.01); *F01N 2610/02* (2013.01); *F01N 2610/1413* (2013.01); *F01N 2610/1466* (2013.01)

(58) Field of Classification Search
CPC combination set(s) only.
See application file for complete search history.

(56) References Cited

U.S. PATENT DOCUMENTS

| 8,413,431 B2 * | 4/2013 | Erdmann | B60K 15/03519 60/295 |
|---|---|---|---|
| 8,967,181 B2 * | 3/2015 | Wetzel | B60K 15/03519 137/202 |
| 9,186,632 B2 * | 11/2015 | Schroeder | B60K 15/03504 |
| 2006/0180241 A1 * | 8/2006 | McClung | B29C 66/7234 141/285 |
| 2015/0159531 A1 * | 6/2015 | Ryoo | F01N 3/2066 137/199 |
| 2016/0290520 A1 * | 10/2016 | Memmer | B60K 15/03519 |

FOREIGN PATENT DOCUMENTS

| DE | 102014007709 A1 | 12/2015 |
|---|---|---|
| DE | 102014224905 A1 | 6/2016 |
| EP | 1199208 A1 | 4/2002 |
| WO | 2016005192 A1 | 1/2016 |

* cited by examiner

*Primary Examiner* — Binh Q Tran
(74) *Attorney, Agent, or Firm* — Jordan IP Law, LLC; Todd A. Vaughn

(57) ABSTRACT

A tank device for a motor vehicle, and a motor vehicle having such a tank device. The tank device includes a motor vehicle tank, a ventilation outlet, and a filler pipe head configured to fill the motor vehicle tank. The filler pipe head includes a filler opening configured to receive a nozzle during a filling sequence, and a filling ventilation opening configured for movement between an open state during introduction of the nozzle to fluidically connect an inner space of the filler pipe head to the ventilation outlet, and a closed state during removal of the nozzle from the filler opening, the filler pipe head having an operational ventilation opening fluidically connected to the ventilation outlet, and which has a semi-permeable diaphragm to permit flow of gasses therethrough and also to prevent a flow of fluids.

19 Claims, 1 Drawing Sheet

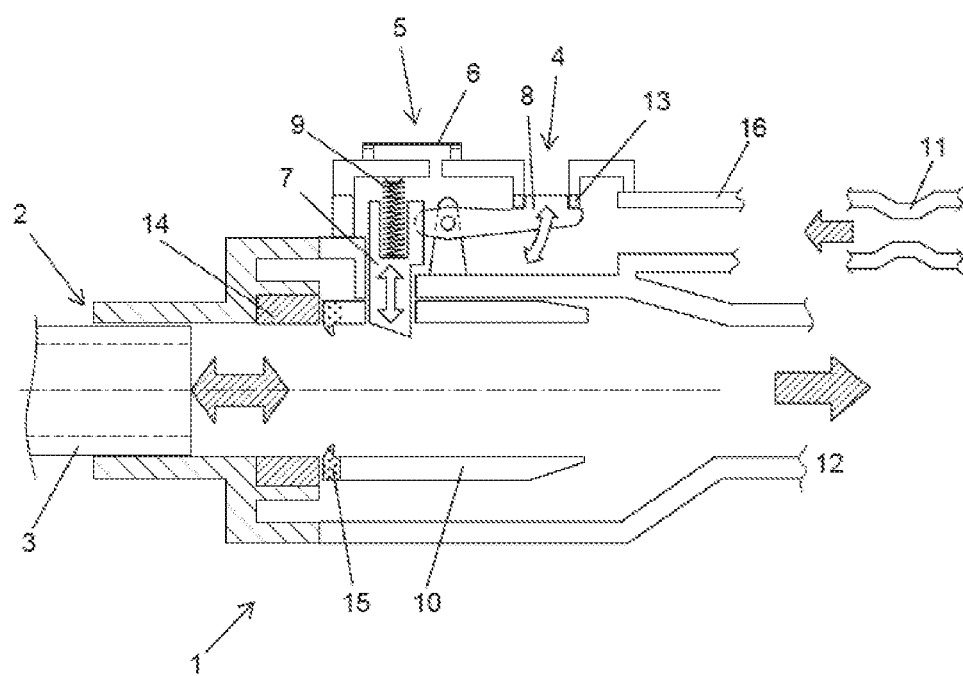

TANK DEVICE

CROSS-REFERENCE TO RELATED APPLICATIONS

The present application claims priority under 35 U.S.C. § 119 to European Patent Application No. EP 17165225.8 (filed on Apr. 6, 2017), which is hereby incorporated by reference in its complete entirety.

TECHNICAL FIELD

Embodiments relate to a tank device for a motor vehicle, in particular, for a selective catalytic reduction (SCR) tank.

BACKGROUND

Tank devices, in particular, for SCR tanks of motor vehicles, are known per se. They can comprise, apart from the motor vehicle tank itself, a filling device, having a filler pipe and a filler pipe head for filling the motor vehicle tank via a nozzle, as well as also a ventilation device which has a ventilation outlet for the discharge of gasses into the surroundings of the vehicle.

Precisely in the case of SCR tanks, such as, in particular, urea tanks which are used for exhaust gas after-treatment, the formation of a suitable ventilation device is difficult. Filling of such tanks may be carried out on one hand via nozzles with high filling speeds of up to 40 L/min, on the other hand also via simple canisters or containers, such as, for example, Kruse bottles. This variety of filling requires in terms of the tank device flexible ventilation devices which also enables filling in a short time as well as reliable ventilation.

Moreover, the properties of the intended tank contents, typically aqueous urea solution which tends to form crystals during redrying, must also be taken into account. The use of float valves in ventilation devices is known per se. Such float valves can form an adequate ventilation path at different filling speeds and prevent the escape of fluid through the ventilation outlet. However, as a result of drying out of residues of the tank contents at the movable float with the associated crystal formation, leaks can arise at the float valve.

SUMMARY

Embodiments relate to an improved tank device for motor vehicles, and particularly, such a tank device which enables reliable ventilation at different filling speeds for a urea tank.

In accordance with embodiments, a tank device for a motor vehicle, may comprise at least one of: a motor vehicle tank, a filler pipe head configured to fill the motor vehicle tank, and a ventilation outlet.

In accordance with embodiments, the filler pipe head may comprise a filler opening configured to introduce a nozzle to fill the motor vehicle tank via the nozzle and a filling ventilation opening.

In accordance with embodiments, the filling ventilation opening is configured to be opened during introduction of the nozzle so that an inner space of the filler pipe head is fluid-connected to the ventilation outlet via the filling ventilation opening. The filling ventilation opening is configured to be closed during removal of the nozzle from the filling opening.

In accordance with embodiments, the filler pipe head has an operational ventilation opening with a semi-permeable diaphragm which makes it possible for gasses to pass therethrough and prevent the passage of fluids. The operational ventilation opening is fluid-connected to the ventilation outlet.

In accordance with embodiments, a filler pipe head is provided which simultaneously has two different ventilation openings, an operational ventilation opening and a filling ventilation opening, which both lead to a common ventilation outlet. The operational ventilation opening is configured to be opened during the entire operation of the tank device or the motor vehicle and also enables adequate filling ventilation in the case of filling via containers such as canisters. The filling ventilation opening is configured to be opened only if a nozzle is used to fill into the filler pipe head. The filling ventilation opening, therefore, is formed for a higher flow rate or a higher volumetric flow for the gas to be discharged than the operational ventilation opening. The operational ventilation opening is equipped with a semi-permeable diaphragm which prevents the undesirable escape of fluid tank content.

Advantageously, movable components are dispensed with which would be controlled via the tank medium such as, for example, an aqueous urea solution. As a result, undesirable crystal formation and leaks are prevented.

Advantageously, by providing two different ventilation paths, reliable ventilation is also ensured in the different filling scenarios.

In accordance with embodiments, the ventilation outlet may be arranged to lie, in an installation position of the motor vehicle, spatially behind the filling opening in the direction of travel, such as, for example, behind a wheel arch liner of the motor vehicle. Semi-permeable diaphragms in ventilation paths including their ventilation outlets are normally formed directly in a filler pipe head or filler neck, for example, in a closure cap, which leads to unpleasant gas odors being discharged in the direction of a user carrying out a filling sequence. By arranging a ventilation outlet spatially behind the filler opening (e.g., behind a wheel arch liner) for both ventilation paths, the gas which occurs during a filling sequence and operational ventilation, for example, ammonia gas mixture, cannot lead to unpleasant odors.

In accordance with embodiments, the filling opening may be formed to receive a filling container, such as, for example, a filling cylinder, so that in this manner there is a further filling possibility, additionally for filling via nozzles. Such a filling cylinder may be, for example, a Kruse bottle.

In accordance with embodiments, the semi-permeable diaphragm may be formed and arranged so that filling ventilation is carried out during a filling sequence via a connected filling container, in particular, a filling cylinder, through the operational ventilation opening and further through the ventilation outlet.

In accordance with embodiments, the filling ventilation opening may be opened during introduction of the nozzle through the filling opening via displacement of an actuating member and/or by pivoting a flap by the nozzle.

In accordance with embodiments, the actuating member may be pre-tensioned in the closing direction by a spring member.

In accordance with embodiments, the flap may be pivoted in the opening direction by displacement of the actuating member during introduction of the nozzle, for example, via an entrainment face.

In accordance with embodiments, the actuating member may be a tappet which is configured to have an introduction slope, and also to project into a flow-guiding apparatus of the filler pipe head.

In accordance with embodiments, the semi-permeable diaphragm may be arranged radially outside the actuating member and/or the flap at the filler pipe head.

In accordance with embodiments, a ventilation path may be established between the operational ventilation opening and/or the filling ventilation opening on one hand, and the fuel tank on the other hand. A restrictor may also be arranged in the ventilation path. Accordingly, rising fluid in the ventilation path, particularly in the case of nozzle filling, may be prevented from reaching the filling ventilation opening.

In accordance with embodiments, the motor vehicle tank may be an SCR tank, in particular, a urea tank.

In accordance with embodiments, a motor vehicle may be fitted with a tank device as disclosed herein so that the ventilation outlet lies behind the filling opening in the direction of travel, in particular, behind a wheel arch liner of the motor vehicle.

DRAWING

Embodiments will be illustrated by way of example in the drawings and explained in the description below.

FIG. 1 illustrates a sectional view of a filler pipe head of a tank device, in accordance with embodiments.

DESCRIPTION

As illustrated in FIG. 1, a tank device is provided as a motor vehicle tank (not illustrated) for filling an SCR tank such as, for example, a urea tank. The tank device comprises, in addition to the motor vehicle tank, a filler pipe head 1 for filling the motor vehicle tank which forms a transition into a filler pipe 12 in the region of the represented arrow at the right-hand end of filler pipe head 1. A filling opening 2 for the introduction of a nozzle 3 for filling the motor vehicle tank via nozzle 3 is provided at the left-hand end of the filler pipe head 1. The filler opening 2 of the filler pipe head 1 forms a transition into a flow-guiding apparatus 10 via an annular magnet 14 and a likewise radial lip seal 15.

A filling ventilation opening 4 is configured to be opened during introduction of the nozzle 3, and is formed radially outside the flow-guiding apparatus 10 so that an inner space of filler pipe head 1 is fluid-connected to the ventilation outlet (not illustrated), via the filling ventilation opening 4.

An actuating member 7, which may be formed as a tappet, is configured for displacement so as to project through a recess of the flow-guiding apparatus 10 into the interior of filler pipe head 1, and to serve as the opening mechanism for the filling ventilation opening 4. The actuating member 7 has an introduction slope which brings about an increasing displacement of the actuating member 10 in the event of further introduction of nozzle 3. By displacing the actuating member 7, pivoting is performed via a flap 8 attached to a lever, which flap 8 releases the filling ventilation opening 4.

The actuating member 7 is pre-tensioned in the closing direction by a spring member 9 so that filling ventilation opening 4 remains closed via the flap 8 without an introduced nozzle 3.

The filler pipe head 1 furthermore has an operational ventilation opening 5 which is always opened by a semi-permeable diaphragm 6 for the passage of gasses, and closed for the passage of fluid such as, for example, the tank medium. The operational ventilation opening 5 is configured, like the filling ventilation opening 4, to be fluid-connected to the ventilation outlet. The ventilation outlet is formed so that it lies, in an installation position of the motor vehicle, spatially behind the filler opening 2 in the direction of travel, in particular, spatially behind a wheel arch liner of the motor vehicle.

A ventilation path 16 is arranged between the operational ventilation opening 5 and/or filling ventilation opening 4 on one hand, and the fuel tank (not illustrated), on the other hand. A restrictor 11 is arranged in the ventilation path 16. Consequently, rising fluid in the ventilation path 16, particularly, in the case of a nozzle filling sequence, may be prevented from reaching the filling ventilation opening 4.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second, etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

LIST OF REFERENCE SYMBOLS

1 Filler pipe head
2 Filler opening
3 Nozzle
4 Filling ventilation opening
5 Operational ventilation opening
6 Semi-permeable diaphragm
7 Actuating element
8 Flap
9 Spring member
10 Flow-guiding apparatus
11 Restrictor
12 Filler pipe
13 Seal
14 Annular magnet
15 Lip seal
16 Ventilation path

What is claimed is:

1. A tank device for a motor vehicle, comprising:
a ventilation outlet in communication with a tank of the motor vehicle;
a filler pipe head configured to facilitate filling of the tank, the filler pipe head including:
a filler opening configured to receive a nozzle during a filling sequence, and
a filling ventilation opening configured for movement between an open state during introduction of the nozzle to fluidically connect an inner space of the filler pipe head to the ventilation outlet, and a closed state during removal of the nozzle from the filler opening, the filler pipe head having an operational ventilation opening fluidically connected to the ventilation outlet, and which has a semi-permeable diaphragm to permit flow of gasses therethrough and also to prevent a flow of fluids, an actuating member configured for displacement to thereby move the filling ventilation opening to an open state during introduction of the nozzle through the filler opening; and a flap configured for pivoting movement when in contact by the nozzle to thereby move the filling ventilation opening to an open state during introduction of the nozzle through the filler opening.

2. The tank device of claim 1, wherein the ventilation outlet is arranged to lie, when in an installation position, spatially behind the filler opening in a direction of travel of the motor vehicle.

3. The tank device of claim 1, wherein the ventilation outlet is arranged to lie, when in an installation position, spatially behind a wheel arch liner of the motor vehicle.

4. The tank device of claim 1, wherein the filler opening is configured to receive a filling container.

5. The tank device of claim 4, wherein the semi-permeable diaphragm is configured so that ventilation is conducted during the filling sequence, via the filling container through the operational ventilation opening and the ventilation outlet.

6. The tank device of claim 1, further comprising an actuating member configured for displacement to thereby move the filling ventilation opening to an open state during introduction of the nozzle through the filler opening.

7. The tank device of claim 6, further comprising a spring member to pre-tension the actuating member in a closing direction.

8. The tank device of claim 6, wherein the filler pipe head further comprises a flow-guiding apparatus through which the actuating member is to project.

9. The tank device of claim 6, wherein the semi-permeable diaphragm is arranged radially outside the actuating member.

10. The tank device of claim 1, further comprising a flap configured to pivot when in contact by the nozzle to thereby move the filling ventilation opening to an open state during introduction of the nozzle through the filler opening.

11. The tank device of claim 1, further comprising a spring member to pre-tension the actuating member in a closing direction.

12. The tank device of claim 1, wherein the filler pipe head further comprises a flow-guiding apparatus through which the actuating member is to project.

13. The tank device of claim 1, wherein the semi-permeable diaphragm is arranged radially outside the actuating member.

14. The tank device of claim 1, wherein the flap is configured to pivot in an opening direction by displacement of the actuating member during introduction of the nozzle.

15. The tank device of claim 1, further comprising:
a ventilation path arranged between the operational ventilation opening and the fuel tank; and
a restrictor may be arranged in the ventilation path to prevent rising fluid in the ventilation path during the filling sequence, from reaching the filling ventilation opening.

16. The tank device of claim 1, further comprising:
a ventilation path arranged between the filling ventilation opening and the fuel tank; and
a restrictor may be arranged in the ventilation path to prevent rising fluid in the ventilation path during the filling sequence, from reaching the filling ventilation opening.

17. The tank device of claim 1, wherein the motor vehicle tank comprises a urea tank.

18. A tank device for a motor vehicle, comprising:
a ventilation outlet in communication with a tank of the motor vehicle;
a filler pipe head configured to facilitate filling of the motor vehicle tank, the filler pipe head including a filler opening, and a filling ventilation opening configured for movement between an open state during introduction of a nozzle therethrough, and a closed state during removal of the nozzle from the filler opening;
an actuating member configured for displacement to thereby move the filling ventilation opening to an open state during introduction of a nozzle through the filler opening; and
a flap configured for pivoting movement when in contact by the nozzle to thereby move the filling ventilation opening to an open state.

19. A motor vehicle, comprising:
a tank;
a tank device that includes a ventilation outlet in communication with the tank, and a filler pipe head configured to facilitate filling of the motor vehicle tank, the filler pipe head including a filler opening, and a filling ventilation opening configured for movement between an open state during introduction of a nozzle therethrough, and a closed state during removal of the nozzle from the filler opening;
an actuating member configured for displacement to thereby move the filling ventilation opening to an open state during introduction of a nozzle through the filler opening; and
a flap configured for pivoting movement when in contact by the nozzle to thereby move the filling ventilation opening to an open state.

* * * * *